United States Patent [19]

Reis

[11] 4,064,476
[45] Dec. 20, 1977

[54] AIR PRESSURE TRANSDUCER
[75] Inventor: Robert D. Reis, Hingham, Mass.
[73] Assignee: United Electric Controls Company, Watertown, Mass.
[21] Appl. No.: 717,280
[22] Filed: Aug. 24, 1976
[51] Int. Cl.² ............................................. H01L 10/10
[52] U.S. Cl. .................................. 338/41; 73/398 AR; 338/4; 338/36
[58] Field of Search ............................. 338/4, 36, 41; 73/398 AR

[56] References Cited

U.S. PATENT DOCUMENTS

| | | | |
|---|---|---|---|
| 2,831,094 | 4/1958 | Bourns et al. | 338/125 |
| 2,985,859 | 5/1961 | Deniston | 338/125 |
| 3,283,283 | 11/1966 | Denner et al. | 338/41 X |
| 4,023,000 | 5/1977 | Ankeny et al. | 338/41 X |

Primary Examiner—C. L. Albritton
Attorney, Agent, or Firm—Dike, Bronstein, Roberts, Cushman & Pfund

[57] ABSTRACT

A transducer wherein a brush arm is supported for pivotal movement of its distal end along a bank of terminals in a circuit where there is a common terminal and a bank of terminals by expansion and contraction of a bellows. Brushes at the proximal and distal ends of the brush arm are yieldably held engaged with the bank of terminals at the distal end and the common terminal at the proximal end for adding resistances to and removing resistances from the circuit in proportion to changes in pressure. The bellows is supported in a capsule for linear expansion and contraction and contains an open end for receiving, a plug mounting the circuit, brush arm, and linkage as a unit, into operative relation to the bellows, said linkage providing for converting the linear movement of the bellows to rotational movement of the brush arm and for adjustment of the range of movement of the brush arm along the bank of terminals.

14 Claims, 10 Drawing Figures

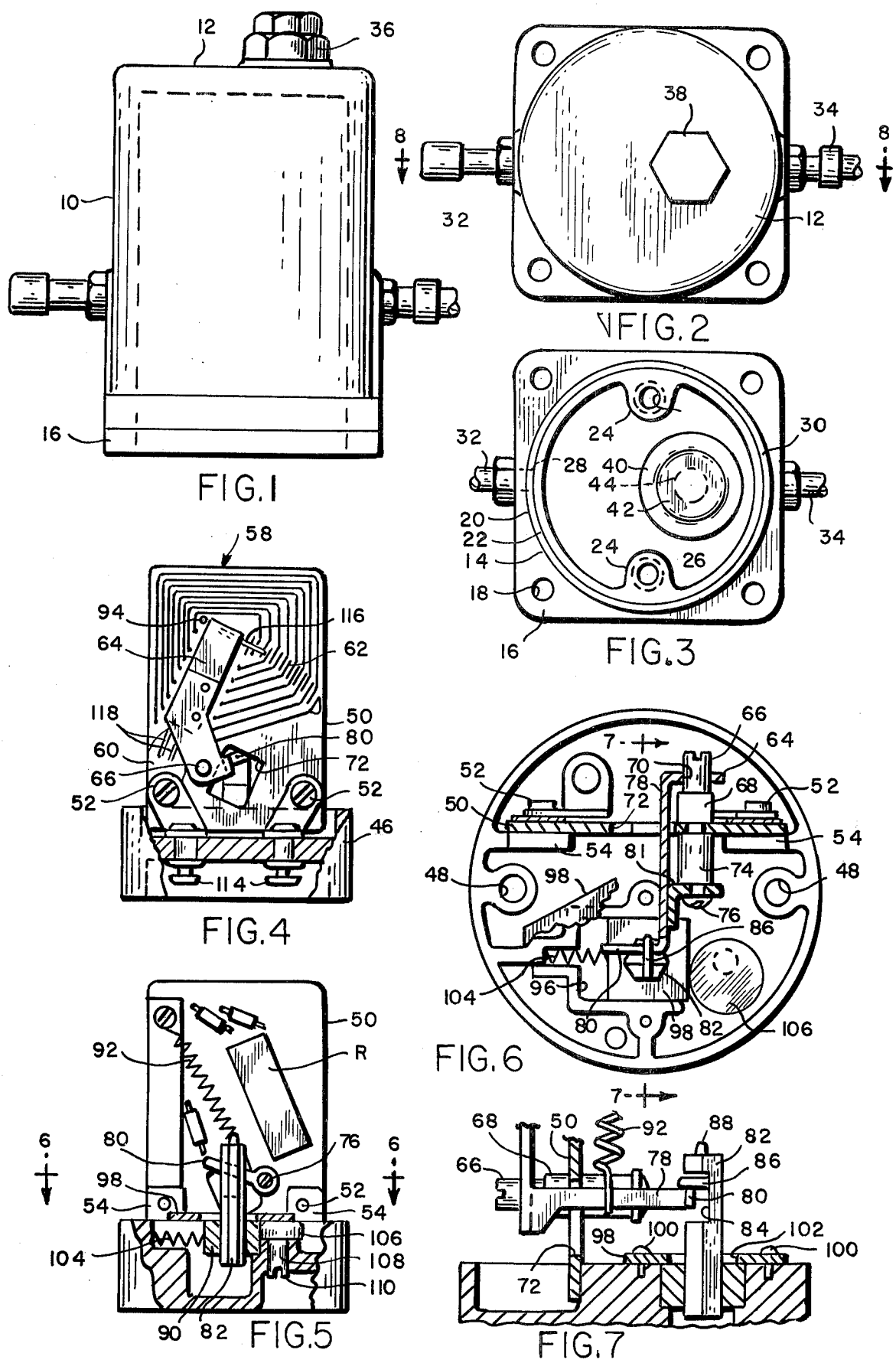

AIR PRESSURE TRANSDUCER

BACKGROUND OF INVENTION

In U.S. Pat. No. 3,283,283, assigned to United Electric Controls Company, assignee of this application, there is shown a pressure transducer wherein a pressure responsive device in the form of a bellows is connected to a brush arm so as to move the brush arm along a bank of terminals and, by such movement, add to or remove resistance from the circuit - the purpose to change the resistance in the circuit in proportion to changes in pressure. In the aforesaid patent, a pair of brushes at the distal end of the brush arm provide the means for adding or removing resistances. The transducer of this application constitutes an improvement of the transducer shown in the aforesaid patent in that while two brushes are employed, only one is moved from terminal-to-terminal, the other remaining in constant contact with a common terminal, thus providing for more precise step changes; that the brushes are directly connected to the brush arm and to each other, thereby eliminating lead-in wires, that an externally accessible span adjustment is provided so as to enable adjustment of the range of the unit without disassembly, that a sealtight, capsule-like housing is provided for receiving the component parts, and that a closure plug is designed to be received in the open end of the capsule which mounts the component parts except for the bellows for assembly as a unit within the capsule in operative engagement with the bellows.

SUMMARY OF INVENTION

As herein illustrated, the transducer comprises an element embodying a part movable linearly in response to a change in pressure, a circuit comprising a plurality of resistances arranged in series including a common terminal and a bank of closely spaced terminals, the distance between the terminals being less than the width of the terminals, a brush arm, means pivotally supporting the brush arm with its proximal end adjacent the common terminal and its distal end adjacent the bank of terminals for movement of its distal end along the bank of terminals, electrically connected brushes at the proximal and distal ends of the brush arm, said brushes having convex ends for tangential engagement with the terminals, the brush at the proximal end being yieldably held in constant rubbing engagement with the common terminals throughout movement of the brush arm and the brush at the distal end being yieldably held in rubbing engagement with the bank of terminals and being movable from terminal-to-terminal along the bank to add resistances to the circuit or remove them therefrom, said brush at the distal end of the arm being narrower than the space between terminals and being adapted by engagement with the terminals to complete a circuit to the common terminal and linkage operably connecting the linearly movable part of the element responsive to pressure to the proximal end of the brush arm for converting the linear movement of the pressure responsive part to rotational movement of the brush arm. An enclosure capsule is provided closed at one end and open at the other within which the part is supported with one end fixed to the closed end of the capsule and its other end movable linearly toward the open end of the capsule. The closure plug is designed to be telescopically received in the open end of the capsule and mounts the circuit, brush arm and linkage as a unit for installation into the capsule in operative relation to the pressure responsive part. The linkage includes means for converting the linear movement of the linearly movable part to rotational movement of the brush arm and there is means externally accessible for adjusting the span of rotational movement of the brush arm. The linealy movable part is a bellows and is mounted at one end to the capsule by means of a screw which is available from exteriorly of the capsule to provide for calibration without disassembly.

The invention will now be described in greater detail with reference to the accompanying drawings, in which:

FIG. 1 is an elevation of the unit comprising the air pressure transducer;

FIG. 2 is a top view of the unit;

FIG. 3 is a bottom view with the closure plug on which the electrical components of the transducer are mounted removed;

FIG. 4 is a front elevation of the plug on which the electrical components are mounted removed;

FIG. 5 is a rear view of FIG. 4;

FIG. 6 is a section taken on the line 6—6 of FIG. 5;

FIG. 7 is a view taken on the line 7—7 of FIG. 6;

Figure 8:
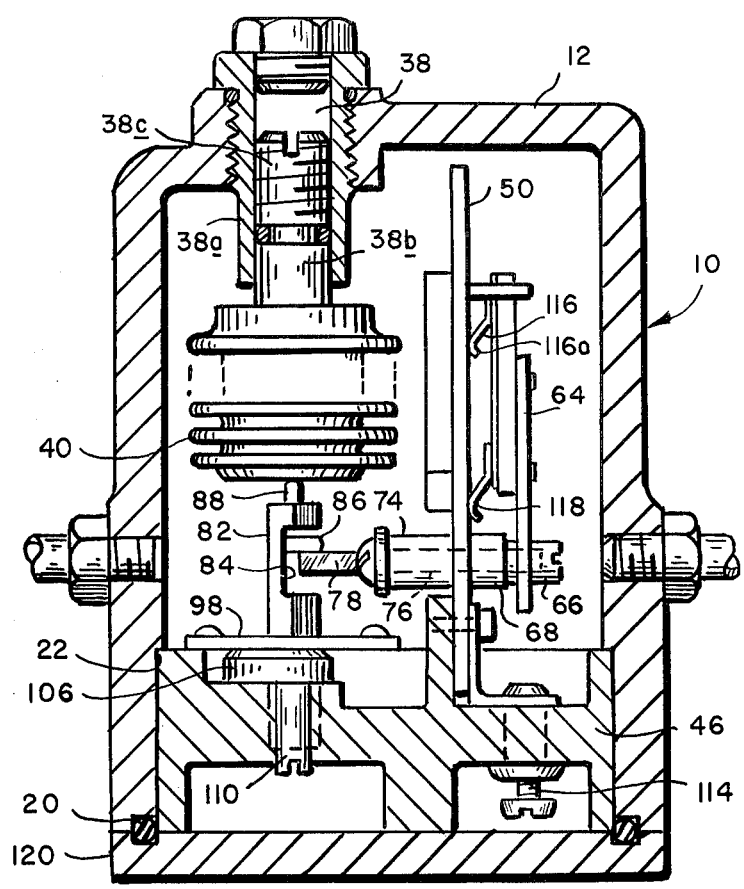
FIG. 8 is a vertical diametrical section through the assembled unit showing the electrical components in elevation.

The unit comprises, as shown in FIG. 1, a cast metal housing 10 of circular cross section having a closed end 12 and an open end 14 surrounded by an attaching flange 16 of substantially rectangular configuration containing bolt holes 18 by means of which it may be attached to the installation wherein it is used. As shown in FIG. 3, the housing contains at its open end a recessed annular shoulder 20, a second recessed annular shoulder 22 further in from the open end and at this level a pair of diametrically disposed lugs 24–24 containing threaded openings 26-26. At diametrically opposed sides, there are threaded openings 28 and 30 in which there are respectively screwed a Schrader valve housing 32 and valve assembly and a coupling 34. A third threaded opening 36 is provided in the closed end into which is secured a mounting 38 for a pressure responsive element 40 in the form of a bellows connected at one end to the mounting and closed at its opposite end. At the opposite end there is a protruding button 42 containing a recess 44 which is perfectly flat. The mounting for the fixed end of the bellows is a hollow bushing sleeve 38a within which the end 38b of the bellows is telescopically received. A screw 38c threaded into the bushing sleeve rotatably received in the end 38b provides for adjusting the longitudinal position of the bellows within the housing to enable calibrating the instrument at sea level.

A plug member 46, FIGS. 4, 5 and 6, a circular cross section corresponding in axial length to the depth of the second annular shoulder is dimensioned to be inserted into the chamber and to be secured therein by means of screws inserted through the holes 48-48 and screwed into the threaded openings 26-26. The plug 46 is adapted to support the electrical components and the mechanism for effecting their operation in response to movement of the pressure responsive element so that they may be removed from the housing or installed therein as a unit and by such installation be operable to the pressure responsive means.

Referring to FIGS. 4 to 7 inclusive, the plug 46 has a rigid panel 50 secured at its lower end perpendicular thereto by means of screws 52-52 to lugs 54-54 formed integral with the plug which comprises a molding of a suitable insulative kind of synthetic resin. The panel itself is comprised of a nonconductive material and has on its face a printed circuit 58, FIGS. 4 and 9, including a common terminal 60, a bank of terminals 62, and a brush arm 64. The brush arm 64 is pivotally mounted on a stud 66 screwed into a bushing 68. The stud 66 is reduced at 70 to provide a bearing for the arm. The panel contains an opening 72 and, at the opposite side of the panel, there is a bearing sleeve 74 which is secured to the opposite side in alignment with the bushing 68 by means of a screw 76. The arm 64 has at its proximal end a narrow bar 78, FIG. 7, which extends rearwardly therefrom through the opening 72 in the panel parallel to the axis of the bushings 68 and 74. The distal end of the bar 78 has a right angularly bent portion 80 and intermediate the ends there is an angle member 81, one leg of which is spot-welded to the bar and the other of which contains an opening for receiving the screw 76.

At the rear side of the panel there is a post 82, FIGS. 5 and 7, containing a notch 84 within which there is mounted a horizontally disposed pin 86 and at the upper end of which there is mounted an axially extending pin 88. The post is mounted in a perpendicular position with its axis parallel to the plane of the panel and with its lower end in a bearing block 90, FIG. 5. The post 82 is movable axially in its bearing block and the bent portion 80 of the bar is located within the notch 84 at the underside of the pin 86. The bent portion 80 is yieldably held against the pin 86 by a coil spring 92, FIG. 5, one end of which is connected to the rear side of the panel and the other end of which is provided with a hook 93 connecting it to the bar so as to hold the post elevated. In this position, the arm 64 bears against a stop pin 94 fixed to the face of the panel near one end of the bank of terminals providing a zero position in the operation of the device.

To provide for adjusting the range of movement of the arm 64 along the bank of terminals, the block 90, FIG. 6, is slidably mounted in a rectangular opening 96 formed in the plug which is longer than the block so that the latter can move parallel to the panel. The block 90 is retained in the opening by a cover plate 98 fastened by screws 100—100. The cover plate 98 contains an elongate opening 102 which permits the post to move a suitable distance in either direction to provide the amount of control wanted. A spring 104 is disposed between one end of the opening 96 and the block and a cam 106 is supported at the other end of the block which, by rotation, is adapted to adjust the block variable amounts relative to the panel to change the extent of movement of the brush arm along the bank of terminals. The cam is secured to a pin 108, FIGS. 5 and 6, journaled in the plug, the head 110 of which is exposed at the outer side of the plug so as to provide means for making the adjustments without disassembling the structure. There are straps 112—112 extending from the screws 52—52 to connector elements 114—114 which are also exposed at the outer side of the plug for attaching the instrument to the circuit to be controlled.

Figure 9:
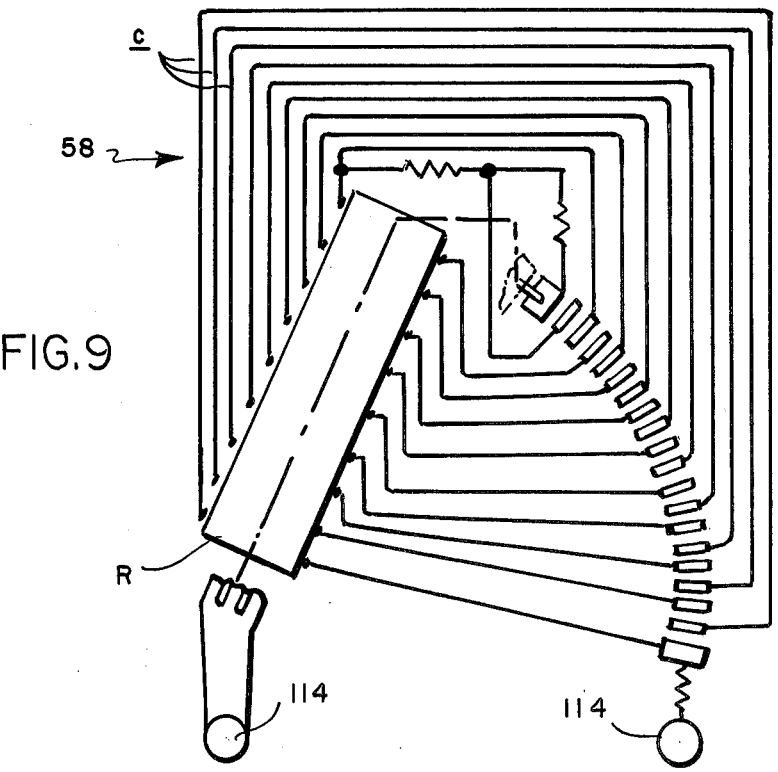
FIG. 9 is the circuit diagram.
Figure 10:
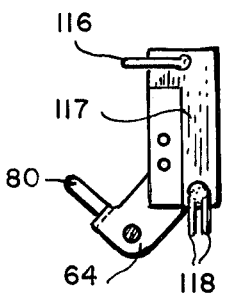
FIG. 10 is a plan view of the brush arm showing the electrical connection between the brushes at the distal and proximal ends.

The printed circuit 58, FIG. 9, comprises a plurality of conductors printed on the surface of the panel 50 which connect a plurality of resistances R attached to the back side of the panel in series to the opposite ends of the bank of terminals 62. As shown, the bank of terminals is arcuate, having its center at the center of rotation of the brush arm 64 and the latter has at its distal end a spring finger 116 which has at its end a convex portion 116a which is yieldably held in tangential engagement with the flat surfaces of the terminals as the brush arm is moved along the bank of terminals so that at no time is it possible for the finger to have contact with more than one terminal. The terminals are narrow elongate prints spaced apart approximately one sixty-fourth of an inch and approximately one sixty-fourth of an inch in width in the direction of travel of the arm so that a high degree of precision is afforded in operation. At the proximal end of the brush arm 64, there are two spring fingers 118-118 similar to the finger 116 at the distal end which have tangential engagement with the flat surface of the common terminal 60. The brushes 116, 118-118 are electrically connected by a conductor recessed into the arm 64. The resistances R are in the form of a block of resistances secured to the rear side of the panel and are connected to the terminals in the face of the panel by the respective conductors c.

The structure is designed to provide a small size unit, for example, the entire unit may be only 3 inches from bottom to top and 2 ½ inches in diameter. By using a single bank of terminals, more precise step changes may be obtained, and by connecting the brushes to the brush arm, electrical leads may be eliminated. The external span adjustment enables making adjustments without disassembling the unit and the removable plug to which the electrical components and linkage are mounted make it easy to repair.

The pin 86 with which the bent portion 80 of the bar 78 is engaged provides for tangential contact and minimum frictional resistance to wear. The pin 88 is arranged to bear against the flat surface 44 at the end of the bellows and thus to transmit the motion of the bellows to the post with the least amount of friction and wear. A protective covering 120 is applied over the open end of the housing, including a sealing ring 122.

It should be understood that the present disclosure is for the purpose of illustration only and includes all modifications or improvements which fall within the scope of the appended claims.

I CLAIM:

1. A transducer comprising an element embodying a part movable linearly in response to a change in pressure, a circuit comprising a plurality of resistances arranged in series including a common terminal and a bank of closely spaced terminals, a brush arm, means pivotally supporting the brush arm with its proximal end adjacent the common terminal and its distal end adjacent the bank of terminals for movement of its distal end along the bank of terminals, electrically connected brushes at the proximal and distal ends of the brush arm, said brushes having convex ends for tangential engagement with the terminals, the brush at the proximal end being yieldably held in constant rubbing engagement with the common terminal throughout movement of the brush arm and the brush at the distal end being yieldably held in rubbing engagement with the bank of terminals and being movable from terminal-to-terminal along the bank to add resistance to and remove resistance from the circuit, said brush at the distal end of the arm being narrower than the spaces between the terminals and being adapted by engagement with a terminal to complete a circuit to the common terminal and linkage operably connecting the linearly movable part of the element responsive to pressure to the proximal end of the brush arm for converting the linear movement of the pressure responsive part to rotational movement of the brush arm.

2. An instrument according to claim 1 wherein the terminals in the bank of terminals lie in a common plane and the brush arm is movable in a plane parallel to the plane of the bank of terminals.

3. A transducer according to claim 1 comprising a capsule closed at one end and open at the other within which the linearly movable part is mounted with one end fixed to the closed end of the capsule and the other end movable toward the open end, and a closure plug dimensioned to be telescopically received in the open end of the capsule in leak-tight relation thereto, said closure plug mounting the circuit, brush arm and linkage as a unit for installation in the capsule, with the linkage in operative relation to said other end of the linearly movable part.

4. An instrument according to claim 1 wherein the part movable linearly in response to a change in pressure is a bellows and there is means adjustably fixing the one end of the bellows to the closed end of the capsule for movement linearly therein.

5. An instrument according to claim 4 wherein the means adjustably fixing the one end of the bellows to the closed end of the capsule is a screw accessible from exteriorly of the capsule.

6. A transducer according to claim 1 wherein the linkage comprises a bar connected at one end to the proximal end of the brush arm at a predetermined radial distance from the pivot axis, said bar extending parallel to said axis and having at its distal end a right angularly bent portion, a post surrounded at one end in a bearing for movement axially in a plane parallel to the plane of rotation of the brush arm, said post containing a slot within which the right angularly bent portion of the bar resides, said post being axially movable in its bearing and by such axial movement operating to rock the bar and, hence, the brush arm about the pivot axis of the brush arm which, in turn, moves the brush arm along the bank of terminals and means for adjustably moving the post in a direction along the right angularly bent portion of the bar to control the angular rotation of the bar and, hence, the travel of the distal end of the brush arm along the bank of terminals.

7. An instrument according to claim 6 wherein the last named means comprises a track parallel to the plane of the bank of terminals, supporting the bearing for movement parallel to said bank, means yieldably bearing against one end of the bearing biasing the bearing in one direction along the track and adjustable means bearing against the other end of the bearing for displacing the bearing in a direction towards the means yieldably bearing against the one end.

8. An instrument according to claim 6 wherein the last named means comprises a track parallel to the plane of the bank of terminals, supporting the bearing for movement parallel to said bank, a spring engaged at one end of the bearing biasing it in one direction along the track and an eccentric bearing against the other end operable by rotation to displace the bearing in a direction towards the spring.

9. An instrument according to claim 6 wherein the last named means comprises a track which contanias an elongated slot in which the bearing is seated for movement parallel to the plane of the bank of terminals, a spring interposed between one end of the slot and the bank and an eccentric mounted at the other end of the slot against which the bearing is held by the spring and means for rotating the eccentric.

10. An instrument according to claim 9 wherein the last named means is accessible from the outer side of the plug.

11. An instrument according to claim 6 wherein said slot within which the bent end portion of the bar resides contains a cylindrical pin fixed at one end therein parallel to the bent end portion such that it presents a cylindrical surface for engagement of the bent end portion therewith.

12. An instrument according to claim 6 wherein the post has at its distal end a pin for engagement with said other end of the linearly movable part.

13. An instrument according to claim 6 wherein said other end of the linearly movable part has a flat surface and the post has as its distal end a pin having a curved surface for tangential engagement with said flat surface.

14. An instrument according to claim 1 wherein there is a limit pin at one end of the bank of terminals and a spring biases the brush arm in a direction to hold it against said limit pin.

* * * * *